A. L. GREENLAW.
SYSTEM OF TRAIN PIPE CONNECTIONS.
APPLICATION FILED MAY 5, 1911.

1,044,644.

Patented Nov. 19, 1912.

2 SHEETS—SHEET 1.

Witnesses:
N. C. Lombard
Mary C. Smith

Inventor:
Arthur L. Greenlaw,
by Walter E. Lombard,
Atty.

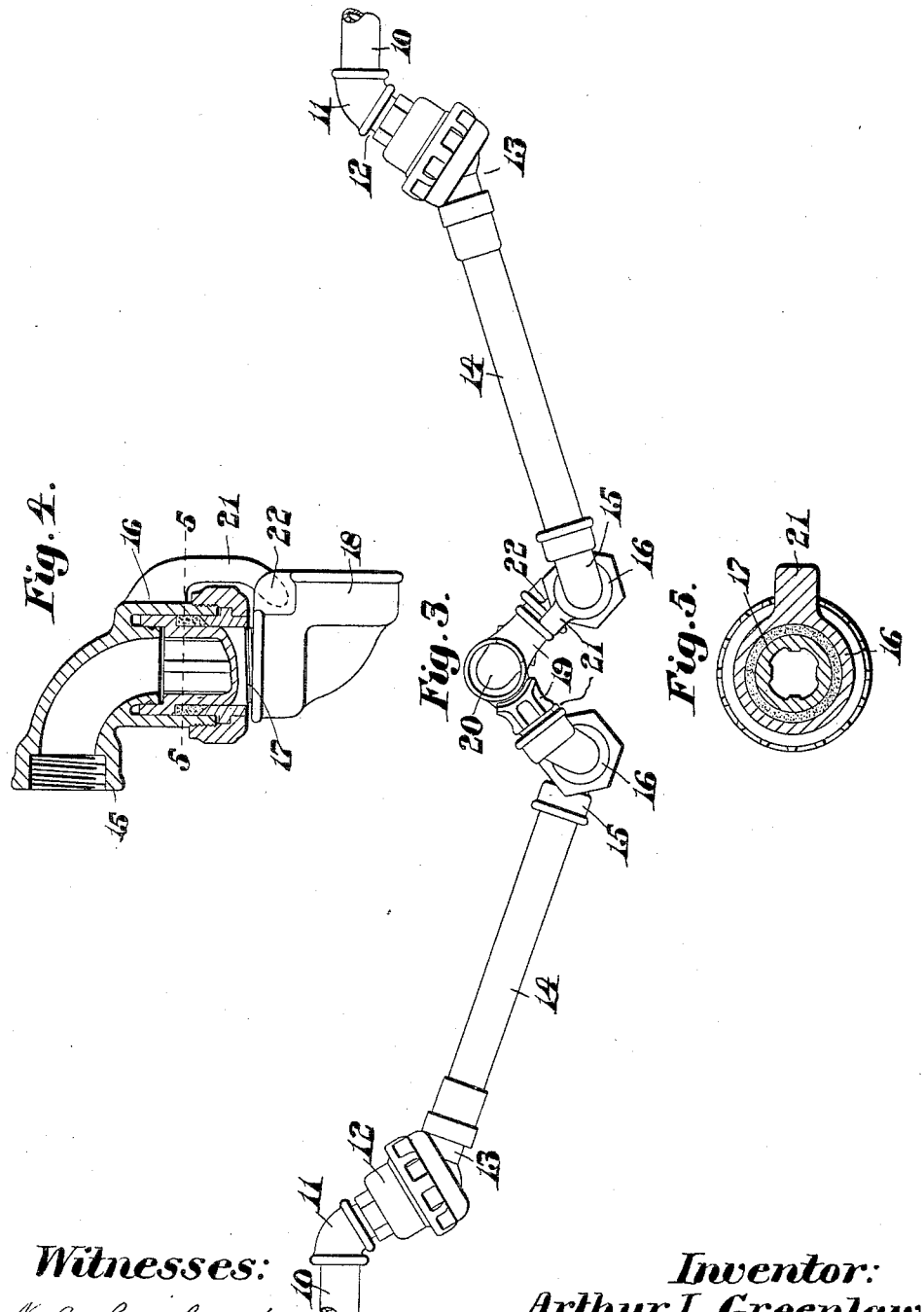

UNITED STATES PATENT OFFICE.

ARTHUR L. GREENLAW, OF MALDEN, MASSACHUSETTS, ASSIGNOR TO THE GREENLAW MANUFACTURING CO., OF BOSTON, MASSACHUSETTS, A CORPORATION OF MAINE.

SYSTEM OF TRAIN-PIPE CONNECTIONS.

1,044,644. Specification of Letters Patent. Patented Nov. 19, 1912.

Application filed May 5, 1911. Serial No. 625,335.

*To all whom it may concern:*

Be it known that I, ARTHUR L. GREENLAW, a citizen of the United States of America, and a resident of Malden, in the county of Middlesex and State of Massachusetts, have invented certain new and useful Improvements in Systems of Train-Pipe Connections, of which the following is a specification.

This invention relates to train pipe connections and particularly to the devices for connecting the train pipes that are used for the purpose of conveying air to the air brakes, the object of the invention being to provide a system that will afford ample opportunity for the connections to be subjected to normal strains without effecting the uncoupling of the coupling members while such uncoupling will be automatically and positively effected by any abnormal strain such as the separation of the cars.

The invention consists in certain novel features of construction and arrangement of parts which will be readily understood by reference to the description of the drawings and to the claims hereinafter given.

Figure 1:
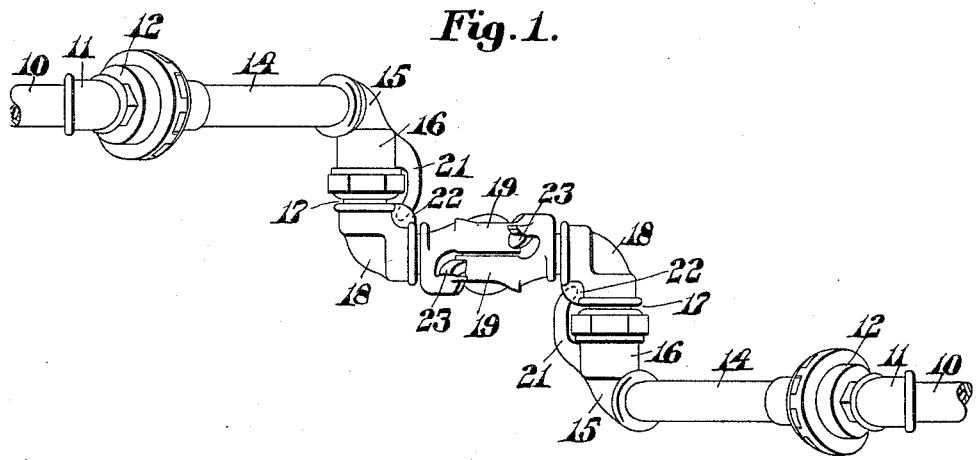
Figure 2:
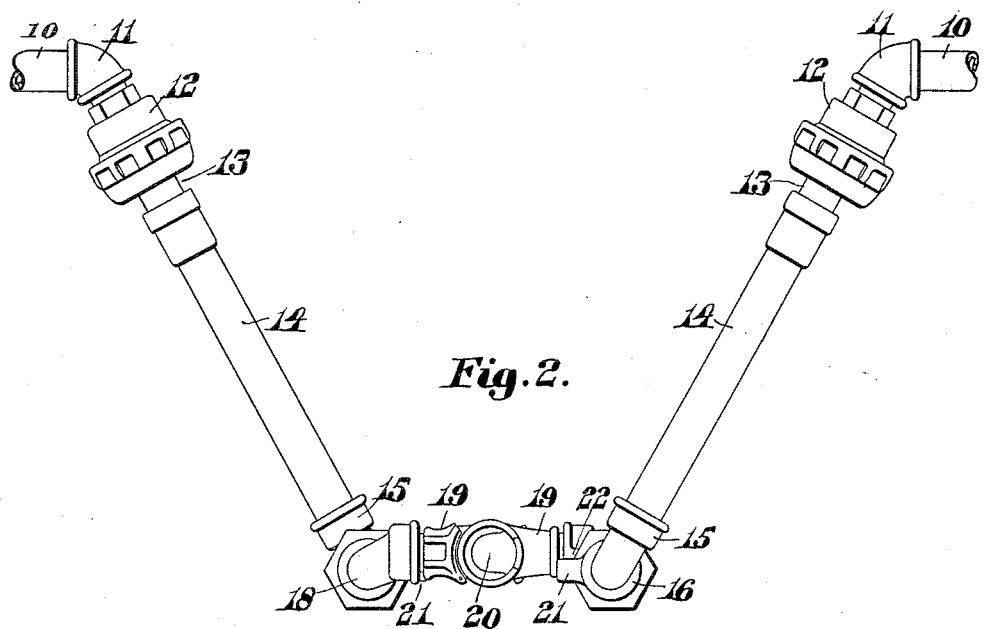

Of the drawings: Figure 1 represents a plan of a train pipe connection embodying the features of the present invention. Fig. 2 represents an elevation of the same in its normal position. Fig. 3 represents a similar view of the same connection in the position the various members assume when the cars begin to separate. Fig. 4 represents a section through one of the rotary joints, and Fig. 5 represents a transverse section of the same, the cutting plane being on line 5—5 on Fig. 4.

Similar characters designate like parts throughout the several figures of the drawings.

In the drawings, 10, 10 represent two train pipes to the end of each of which is secured an elbow 11, the opposite end of which has mounted thereon a fixed member 12 of a ball and socket joint, the movable member 13 of which has connected thereto a pendant pipe section 14. To the lower end of this pendant pipe section 14 is secured an elbow 15 one branch 16 of which is horizontal and cup-shaped forming a socket member into which extends a male member 17 on the outer end of which is mounted an elbow 18, the other branch of which connects with a coupling member 19. This coupling member may be of any well-known construction, as, for instance, the Westinghouse coupler in general use upon steam railroads.

The two coupling members 19 lock together about the horizontal axes thereof and can only be broken by moving the members 19 about this axis 20. One great difficulty found to exist in the use of this coupler where metallic pipe sections are used to connect the two members thereof with the train pipes 10 is that under normal strains to which the pipe connections are subjected the coupling members 19 are liable to be moved about this axis 20 and cause an uncoupling or if the strain is not sufficient to uncouple the pipe members it is liable to move the members sufficiently to cause a leakage between the two members 19. This is obviously very objectionable and the present invention is for the purpose of overcoming this difficulty.

Heretofore, as far as is known, the center 20 is below a line drawn between the horizontal axis of the rotary joints to which these coupling members 19 are secured. Obviously when the pipes are thus connected with the coupling members normal strain thereon will cause the center 20 to be raised and in so doing the coupling members 19 will be moved about the center 20 and thereby cause a leakage of the coupling. This objection has been wholly obviated by placing the center 20 above a line drawn between the horizontal axes of the rotary joints 17 so that normal strains brought to bear upon the pipe connections due to excessive speed of the train and the consequent jar of the various members attached thereto will cause the center 20 to seek to move downwardly, thereby more firmly locking the couplers together and preventing any movement thereof which would tend to uncouple the members 19 or cause a leakage between the two. This result is obtained without changing the ordinary coupling members 19 by making the elbow 18 secured to the outer ends thereof downwardly inclined so that the branch thereof which connects with the movable member 17 of the rotary joint will have its axis considerably below the center 20. It is obvious, however, that some means must be provided whereby when there is an actual separation of the cars the strain upon the coupling members 19 will not be such as to move the center 20 downwardly but will positively move the center 20 upwardly into the position shown in Fig. 3 of the drawings, at which point the coupling members 19 will be permitted to separate and the pendant pipes 14 again drop by their own weight about the pivot of the movable member 13. This positive uncoupling operation is provided for by means of a projecting arm or finger 21 formed upon or secured to the horizontal branch 16 of each elbow 15. This arm or finger 21 is so positioned relative to the axis of said horizontal branch 16 that when the projection 22 formed upon the elbow 18 rests thereon the coupling members 19 will be retained in their normal positions as indicated in Figs. 1 and 2 of the drawings. The projection 22 is radial to the axis of the horizontal branch of the elbow 18, thereby providing a means whereby when the cars separate and the lower ends of the pendant pipes 14 are moved upwardly into the position shown in Fig. 3 of the drawings, the projecting arms 21 will move the male members 17 of the rotary joints about their axes and thus move the center 20 upwardly in a vertical line to the point shown in said Fig. 3, in which position the coupling members 19 are adapted to separate and permit the pendant pipes 14 to drop and hang suspended from the center of the ball joint 12—13.

The rotary joint 16—17 may be of any well-known construction, one embodiment of which is shown in Figs. 4 and 5 of the drawings. Each coupling member 19 is provided with stops 23 which engage with shoulders on the opposing coupling member and prevent the center of the coupling member passing below a line connecting the axes of the rotary joints. It is obvious that the projection 22 may be extended opposite the horizontal branch 16 and the projection 21 shortened to engage therewith without altering the principles of the present invention. It is also obvious that these projections may be differently positioned on the various members providing one is on the rotatable part of the rotary joint, while the other is on a fixed part of said joint, without altering the principles of the present invention.

This invention is an improvement over that of another application filed by Warren A. Greenlaw on March 19, 1910, Ser. No. 550,536, and allowed Feb. 1, 1911. It dispenses with chains or other flexible members used therein which, in practice, have been found at times to be objectionable, owing to their liability to becoming entangled with other members, thereby causing an accidental coupling.

It is believed that the advantages of the construction herein shown simplified in the manner represented in the drawings and described in this specification, will be thoroughly understood without any further description.

Having thus described my invention, I claim:

1. In a device of the class described, the combination of two train pipes; a pendant pipe jointed to the end of each; a coupling member out of alinement with said pendant pipe but connected to its lower end by a rotary joint, the axis of which is horizontal, and adapted to move about the axis of said joint to engage an opposed coupling member; and projections on the two parts of said rotary joint adapted to engage each other and positively unlock said coupling members when the cars separate.

2. In a device of the class described, the combination of two train pipes; a pendant pipe jointed to the end of each; a coupling member connected to the lower end of said pendant pipe by a rotary joint, the axis of which is horizontal, and adapted to move about the axis of said joint to engage an opposed coupling member; and projections on the two parts of said rotary joint adapted to engage each other thereby preventing the center of said coupling members passing below a line connecting the axes of said joints.

3. In a device of the class described, the combination of two train pipes; a pendant pipe jointed to the end of each; a rotary joint on the lower end of each pendant pipe; a coupling member secured to each joint and adapted to engage an opposed coupling member; and lugs on the two parts of said joints engaging each other to prevent the center of said coupling members passing below a line connecting the axes of said joints.

4. In a device of the class described, the combination of two train pipes; a pendant pipe jointed to the end of each; two coupling members adapted to lock together; a downwardly extending elbow secured to each coupling member with one branch horizontal; an elbow secured to the lower end of each pendant pipe with one branch horizontal; a rotary joint interposed between the horizontal branches of each pair of elbows; and lugs on the horizontal branches of said elbows engaging each other and preventing the center of said coupling members passing below a line connecting the axes of said joints.

5. In a device of the class described, the combination of two train pipes; a pendant pipe jointed to the end of each; two coupling members adapted to lock together; a downwardly extending elbow secured to each coupling member with one branch horizontal; an elbow secured to the lower end of each pendant pipe with one branch horizontal; a rotary joint interposed between the horizontal branches of each pair of elbows; and lugs on the horizontal branches of said elbows engaging each other and adapted to positively unlock said coupling members when the cars separate.

6. In a device of the class described, the combination of two train pipes; a pendant pipe jointed to the end of each; two coupling members adapted to lock together and secured to the lower ends of said pendant pipes; and rigid members extending laterally from the lower ends of said pendant pipes and said coupling members engaging each other and adapted to positively unlock said coupling members when the cars separate.

7. In a device of the class described, the combination of two train pipes; a pendant pipe jointed to the end of each; a rotary joint on the lower end of each pendant pipe; a coupling member secured to each joint and adapted to engage an opposed coupling member; and a lug on one of the parts of said joint engaging the other part to prevent the center of said coupling members passing below a line connecting the axes of said joints.

Signed by me at 4 Post Office Sq., Boston, Mass., this 29th day of April, 1911.

ARTHUR L. GREENLAW.

Witnesses:
 WALTER E. LOMBARD,
 NATHAN C. LOMBARD.

---

Copies of this patent may be obtained for five cents each, by addressing the "Commissioner of Patents, Washington, D. C."